(12) United States Patent
Vilcot

(10) Patent No.: US 10,350,944 B2
(45) Date of Patent: *Jul. 16, 2019

(54) TIRE-TYPE DEVICE FOR A VEHICLE

(71) Applicant: COMPAGNIE GENERALE DES ETABLISSEMENTS MICHELIN, Clermont-Ferrand (FR)

(72) Inventor: Florian Vilcot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 88 days.

This patent is subject to a terminal disclaimer.

(21) Appl. No.: 15/543,697

(22) PCT Filed: Jan. 20, 2016

(86) PCT No.: PCT/EP2016/051100
§ 371 (c)(1),
(2) Date: Jul. 14, 2017

(87) PCT Pub. No.: WO2016/116491
PCT Pub. Date: Jul. 28, 2016

(65) Prior Publication Data
US 2017/0368878 A1    Dec. 28, 2017

(30) Foreign Application Priority Data

Jan. 22, 2015 (FR) ...................... 15 50494

(51) Int. Cl.
*B60C 7/14* (2006.01)
*B60C 7/10* (2006.01)
*B60C 7/06* (2006.01)

(52) U.S. Cl.
CPC ............... *B60C 7/14* (2013.01); *B60C 7/143* (2013.01); *B60C 7/06* (2013.01); *B60C 7/10* (2013.01); *B60C 2007/146* (2013.01)

(58) Field of Classification Search
CPC .... B60C 7/10; B60C 7/14; B60C 7/18; B60C 7/143; B60C 7/06; B60C 2007/146
See application file for complete search history.

(56) References Cited

U.S. PATENT DOCUMENTS 2,016,095 A * 10/1935 Martin ................. B60B 9/10
152/303
4,235,270 A    11/1980 Kahaner et al.
(Continued)

FOREIGN PATENT DOCUMENTS

JP          2009 035050      2/2009
WO    WO 2005/007422      1/2005
WO    WO 2009/087291      7/2009

*Primary Examiner* — Kip T Kotter
(74) *Attorney, Agent, or Firm* — Cozen O'Connor

(57) ABSTRACT

Tire-type device having bearing elements (7) within annular space (5) between inner and outer coaxial structures of revolution, the latter contacting the ground in contact patch (A). The bearing elements are independent in pairs and buckle under compression in contact patch (A). The smallest characteristic dimension E of the section S of any bearing element (7) is at most equal to 0.02 times the mean radial height H of the inner annular space (5), the surface density D of the bearing elements (7) per unit area of the radially outer structure of revolution, expressed in $1/m^2$, is at least equal to $Z/(A*\Sigma Fr/n)$, where Z is the nominal radial load, expressed in N, A is the area of contact with the ground, expressed in $m^2$, and $\Sigma Fr/n$ is the mean force at break under tension of the n bearing elements made to buckle under compression, expressed in N.

15 Claims, 6 Drawing Sheets

(56) References Cited

U.S. PATENT DOCUMENTS

| | | | | |
|---|---|---|---|---|
| 8,567,461 B2* | 10/2013 | Williams | ............... | B60C 7/18 |
| | | | | 152/30 |
| 2004/0012246 A1* | 1/2004 | Rhyne | ............... | B60B 1/0223 |
| | | | | 301/55 |
| 2007/0267116 A1 | 11/2007 | Rhyne et al. | | |
| 2008/0314486 A1* | 12/2008 | Manesh | ............... | B60C 7/14 |
| | | | | 152/328 |
| 2009/0294000 A1* | 12/2009 | Cron | ............... | B60B 9/26 |
| | | | | 152/5 |
| 2012/0067481 A1* | 3/2012 | Cron | ............... | B60C 7/12 |
| | | | | 152/326 |
| 2013/0048174 A1* | 2/2013 | Cron | ............... | B60C 7/10 |
| | | | | 152/324 |
| 2013/0240097 A1* | 9/2013 | Cron | ............... | B29D 30/02 |
| | | | | 152/17 |
| 2013/0278044 A1* | 10/2013 | Dotson | ............... | B29D 30/02 |
| | | | | 301/62 |
| 2014/0326374 A1* | 11/2014 | Cron | ............... | B60C 7/102 |
| | | | | 152/5 |
| 2017/0087931 A1* | 3/2017 | Gaylo | ............... | B60B 3/001 |

* cited by examiner

TIRE-TYPE DEVICE FOR A VEHICLE

RELATED APPLICATIONS

This is a U.S. National Phase Application under 35 USC 371 of International Application PCT/EP2016/051100 filed on Jan. 20, 2016.

This application claims the priority of French application no. 1550494 filed Jan. 22, 2015, the entire content of which is hereby incorporated by reference.

FIELD OF THE INVENTION

The present invention relates to a tire-type device intended to equip a vehicle. This tire-type device can be used on all types of vehicle, such as two-wheeled vehicles, passenger vehicles, heavy duty vehicles, agricultural vehicles, construction plant vehicles or aircraft or, more generally, on any rolling device.

BACKGROUND OF THE INVENTION

A conventional tire is a torus-shaped structure that is intended to be mounted on a rim, pressurized by an inflation gas and squashed down onto the ground under the action of a load. At any point on its tread surface, which is intended to come into contact with the ground, the tire has a double curvature: a circumferential curvature and a meridian curvature. Circumferential curvature means a curvature in a circumferential plane, defined by a circumferential direction, tangent to the tread surface of the tire in the rolling direction of the tire, and a radial direction, perpendicular to the axis of rotation of the tire. Meridian curvature means a curvature in a meridian or radial plane, defined by an axial direction, parallel to the axis of rotation of the tire, and a radial direction, perpendicular to the axis of rotation of the tire.

In the following text, the expression "radially inner or, respectively, radially outer" means "closer to or, respectively, further away from the axis of rotation of the tire". The expression "axially inner or, respectively, axially outer" means "closer to or, respectively, further away from the equatorial plane of the tire", the equatorial plane of the tire being the plane that passes through the middle of the tread surface of the tire and is perpendicular to the axis of rotation of the tire.

It is known that the flattening of the tire on horizontal ground, in a circumferential plane and in a meridian plane, is conditioned by the values of the circumferential and meridian radii of curvature, respectively, at the points of the tread surface that are positioned at the limits of the contact patch in which the tire is in contact with the ground. This flattening is all the easier the larger these radii of curvature are, that is to say when the curvatures are low, since the curvature at any one point, in the mathematical sense, is the inverse of the radius of curvature. It is also known that the flattening of the tire has an impact on the performance of the tire, in particular rolling resistance, grip, wear and noise.

Consequently, those skilled in the art, tire specialists, seeking to obtain a good compromise between the expected performance of the tire, such as wear, grip, endurance, rolling resistance and noise, this list not being exhaustive, have developed alternative solutions to conventional tires in order to optimize the flattening thereof.

A conventional prior art tire generally has a high meridian curvature, that is to say a small meridian radius of curvature, at the axial ends of the tread, known as shoulders, when the tire, mounted on its mounting rim and inflated to its recommended use pressure, is subjected to its service load. The mounting rim, the use pressure and the service load are defined by standards, such as the standards of the European Tire and Rim Technical Organization (ETRTO), for example. A conventional tire bears the load applied, substantially by the axial ends of the tread, or shoulders, and by the sidewalls connecting the tread to beads that ensure the mechanical connection of the tire to its mounting rim. It is known that meridian flattening of a conventional tire, with a low meridian curvature at the shoulders, is generally difficult to obtain.

The document U.S. Pat. No. 4,235,270 describes a tire having an annular body made of elastomeric material, comprising a radially outer cylindrical part, at the periphery of the tire, that can comprise a tread, and a radially inner cylindrical part that is intended to be mounted on a rim. A plurality of walls that are spaced apart in the circumferential direction extend from the radially inner cylindrical part to the radially outer cylindrical part and bear the load. Moreover, sidewalls can connect the radially inner cylindrical part and the radially outer cylindrical part in order to form, in association with the tread and the sidewalls, a closed cavity and thereby to allow the tire to be pressurized. However, such a tire has a high mass compared with a conventional tire and, on account of its massive nature, is likely to dissipate a large amount of energy, which can limit its endurance and thus its useful life.

The document WO 2009087291 describes a tire structure comprising an internal, or radially inner, annular shell and an external, or radially outer, annular shell that are connected by two sidewalls and by a bearing structure. According to that invention, the bearing structure is pressurized and divides the annular volume of the tire into a plurality of compartments or cells, and the sidewalls are connected to or integrated with the bearing structure. In that case, the load applied is borne both by the bearing structure and the sidewalls. The distribution of pressure in the contact patch is not homogeneous across the axial width of the contact patch, with raised pressures at the shoulders on account of the difficulty of meridian flattening because of the connection between the sidewalls and the bearing structure. These raised pressures at the shoulders are likely to generate significant wear at the shoulders of the tread.

The document WO 2005007422 describes a compliant wheel comprising a compliant band and a plurality of spokes extending radially inwards from the compliant band to a hub. The compliant band is intended to adapt to the area of contact with the ground and to envelop obstacles. The spokes transmit the load borne between the compliant band and the hub, by virtue of the spokes that are not in contact with the ground being tensioned. Such a compliant wheel requires optimization of the distribution of the spokes so as to ensure a substantially cylindrical periphery. Moreover, a compliant wheel has a relatively high mass compared with a conventional tire.

SUMMARY OF THE INVENTION

One object of the present invention is to provide a tire-type device having improved flattening of its tread when it is subjected to a load.

This objective has been achieved according to one aspect of the invention by a tire-type device intended to equip a vehicle, comprising:

a radially outer structure of revolution, the axis of revolution of which is the axis of rotation of the tire-type device and which is intended to come into contact with the ground via a tread comprising at least one elastomeric material, the radially outer structure of revolution having two axial ends and comprising a circumferential reinforcement, a radially inner structure of revolution that is coaxial with the radially outer structure of revolution and is intended to ensure the connection of the tire-type device with a means for mounting on the vehicle, the radially inner structure of revolution having two axial ends and comprising at least one polymeric material, an inner annular space of mean radial height H that is radially delimited by the radially outer and radially inner structures of revolution, respectively, a bearing structure made up of a plurality of bearing elements that extend continuously from the radially outer structure of revolution to the radially inner structure of revolution and are independent in pairs in the inner annular space, such that, when the tire-type device is subjected to a nominal radial load Z and is in contact with flat ground via an area of contact A, the n bearing elements that are connected to that portion of the radially outer structure of revolution in contact with the ground are made to buckle under compression and at least some of the bearing elements that are connected to that portion of the radially outer structure of revolution that is not in contact with the ground are under tension, each bearing element having a force at break under tension Fr, and a mean section S that has an aspect ratio K equal to L/E, where L and E are the largest and smallest characteristic dimensions, respectively, of the mean section S, the smallest characteristic dimension E of the mean section S of any bearing element being at most equal to 0.02 times the mean radial height H of the inner annular space, and the surface density D of the bearing elements per unit area of the radially outer structure of revolution, expressed in $1/m^2$, being at least equal to $Z/(A*\Sigma Fr/n)$, where Z is the nominal radial load, expressed in N, A is the area of contact with the ground, expressed in $m^2$, and $\Sigma Fr/n$ is the mean force at break under tension of the n bearing elements made to buckle under compression, expressed in N.

Such a tire-type device can have a bearing structure which is made up of bearing elements that are independent in pairs in the inner annular space and is able to bear the load applied to the tire device by the tensioning of some of the bearing elements positioned outside the contact patch, the n bearing elements positioned in the contact patch being made to buckle under compression and therefore not contributing towards bearing the load applied.

Each bearing element extends continuously from the radially outer structure of revolution to the radially inner structure of revolution, that is to say along a trajectory that comprises a first end interfacing with the radially outer structure of revolution and a second end interfacing with the radially inner structure of revolution.

The bearing elements are independent in pairs in the inner annular space, that is to say are not mechanically connected together in the inner annular space, such that they have different mechanical behaviours. For example, they are not connected together so as to form a network or a lattice. They act as independent strands.

Each bearing element has a force at break under tension Fr and a mean section S, these two features not necessarily being identical for all of the bearing elements. The mean section S is the average of the sections obtained by cutting the bearing element through all the cylindrical surfaces which are coaxial with the radially outer surface of revolution and the radially inner surface of revolution and are comprised radially between said two surfaces of revolution. In the most frequent case of a constant section, the mean section S is the constant section of the bearing element. The mean section S comprises a largest characteristic dimension L and a smallest characteristic dimension E, the ratio K=L/E of which is known as the aspect ratio. By way of examples, a bearing element having a circular mean section S, having a diameter equal to d, has an aspect ratio K=1, a bearing element having a rectangular mean section S, having a length L and a width l, has an aspect ratio K=L/l, and a bearing element having an elliptical mean section S, having a major axis A and a minor axis a, has an aspect ratio K=A/a.

According to an embodiment of the invention, the smallest characteristic dimension E of the mean section S of any bearing element is at most equal to 0.02 times the mean radial height H of the inner annular space. This feature rules out any massive bearing element having a large volume. In other words, each bearing element has high slenderness in the radial direction, allowing it to buckle on passing through the contact patch. Outside the contact patch, each bearing element returns to its initial geometry, since the buckling thereof is reversible. Such a bearing element has good fatigue strength.

According to another embodiment of the invention, the surface density D of the bearing elements per unit area of the radially outer structure of revolution, expressed in $1/m^2$, is at least equal to $Z/(A*\Sigma Fr/n)$, where Z is the nominal radial load, expressed in N, A is the area of contact with the ground, expressed in $m^2$, and $\Sigma Fr/n$ is the mean force at break under tension of the n bearing elements made to buckle under compression, expressed in N. $\Sigma Fr/n$ is the mean force at break under tension of the n bearing elements made to buckle under compression, each one having a force at break under tension Fr that is not necessarily constant over all of the bearing elements. Essentially, the distribution of the bearing elements is optimized and the surface density of the bearing elements is sufficiently high to ensure improved flattening of the tread, as it passes through the contact patch, both in a circumferential plane and in a meridian plane, compared with conventional tires and other tire-type devices known from the prior art. The distribution of the bearing elements is more uniform and more dense than in the tire-type devices of the prior art, both circumferentially and axially, this helping to give the tread a virtually cylindrical geometry, with a reduced "rippling" effect, as it is known.

The combination of such features allows improved flattening of the tread, in particular in a meridian plane, by an increase in the meridian radii of curvature at the axial ends of the tread.

This results, in particular, in homogenization of the pressures in the contact patch in contact with the ground, this helping to improve the useful life in terms of wear and grip of the tire-type device.

The combination of such features also allows an increase in the natural vibration frequencies of the tire-type device, this helping to improve the comfort in terms of vibration and noise of the tire-type device.

Finally, the rolling resistance of such a tire-type device is substantially reduced, this being favourable towards lowering the fuel consumption of the vehicle.

It should be noted that, in the tire-type device according to embodiments of the invention, the radially outer and radially inner structures of revolution, respectively, are connected together only by the bearing structure. In other words, the tire-type device does not comprise sidewalls connecting the axial ends of the radially outer and radially inner structures of revolution, respectively, and axially delimiting the inner annular space, such that the inner annular space forms an open cavity that cannot be pressurized by an inflation gas. The bearing structure is thus in direct contact with atmospheric air.

The surface density of the bearing elements per unit area of the radially outer structure of revolution, expressed in $1/m^2$, is advantageously at least equal to $3*Z/(A*\Sigma Fr/n)$. A higher surface density of bearing elements improves the homogenization of the pressures in the contact patch in contact with the ground and ensures a higher safety coefficient with respect to the load applied and with respect to endurance.

The surface density of the bearing elements per unit area of the radially outer structure of revolution, expressed in $1/m^2$, is more advantageously at least equal to $6*Z/(A*\Sigma Fr/n)$. An even higher surface density of bearing elements improves even further the homogenization of the pressures in the contact patch in contact with the ground and makes it possible to further increase the safety coefficient with respect to the load applied and with respect to endurance.

Advantageously, all of the bearing elements have an identical force at break under tension Fr. In other words, the bearing elements have the same force at break under tension, without necessarily having the same geometric characteristics and/or the same constituent materials. This implies that the mean force at break under tension of the n bearing elements that are made to buckle under compression $\Sigma Fr/n$ is equal to the force at break under tension Fr of any bearing element. Under these conditions, the surface density D of the bearing elements per unit area of the radially outer structure of revolution, expressed in $1/m^2$, is at least equal to $Z/(A*Fr)$, where Z is the nominal radial load, expressed in N, A is the area of contact with the ground, expressed in $m^2$, and Fr is the force at break under tension of any bearing element, expressed in N. The probability of the bearing elements failing by breaking under tension is thus the same at any point on the bearing structure.

According to a preferred embodiment, the bearing elements are identical, that is to say that their geometric characteristics and their constituent materials are identical. In particular, with their forces at break under tension Fr being identical, the surface density D of the bearing units per unit area of the radially outer structure of revolution, expressed in $1/m^2$, is at least equal to $Z/(A*Fr)$, where Z is the nominal radial load, expressed in N, A is the area of contact with the ground, expressed in $m^2$, and Fr is the force at break under tension of any bearing element, expressed in N. A bearing structure having identical bearing elements advantageously has homogeneous mechanical behaviour and has the advantage of being easier to manufacture.

According to a first variant of the preferred embodiment, any bearing element is one-dimensional with an aspect ratio K at most equal to 3. In other words, a bearing element is considered to be one-dimensional when the greatest characteristic dimension L of its mean section S is at most equal to 3 times the smallest characteristic dimension E of its mean section S. A one-dimensional bearing element has mechanical behaviour of the thread type, that is to say it can only be subjected to tensile or compressive forces along its mean line. Among components that are commonly used in the field of tires, textile reinforcers, made up of an assembly of spun textile filaments, or metal cords, made up of an assembly of metal threads, can be considered one-dimensional bearing elements, since, their mean section S being substantially circular, the aspect ratio K is equal to 1, and thus less than 3.

When a one-dimensional bearing element in extension has a rectilinear mean line, its mean line is not necessarily radial, that is to say perpendicular to the axis of rotation of the tire. Such a bearing element is not akin to a spoke. This non-radial direction of the mean line makes it possible, in particular, to alter the stiffnesses of the tire device in the axial and circumferential directions, respectively.

In the case of the first variant of the preferred embodiment, the surface density D of the identical one-dimensional bearing elements per unit area of the radially outer structure of revolution, expressed in $1/m^2$, is advantageously at least equal to 5000.

According to a second variant of the preferred embodiment, any bearing element is two-dimensional with an aspect ratio K at least equal to 3. In other words, a bearing element is considered to be two-dimensional when the greatest characteristic dimension L of its mean section S is at least equal to 3 times the smallest characteristic dimension E of its mean section S. A two-dimensional bearing element has mechanical behaviour of the membrane type, that is to say it can only be subjected to tensile or compressive forces in its thickness defined by the smallest characteristic dimension E of its mean section S.

According to a first alternative of the second variant of the preferred embodiment, any bearing element is two-dimensional of the strip type with an aspect ratio K at least equal to 3 and at most equal to 50.

In the case of the first alternative of the second variant of the preferred embodiment, the surface density D of the identical two-dimensional bearing elements of the strip type per unit area of the radially outer structure of revolution, expressed in $1/m^2$, is advantageously at least equal to 600 and at most equal to 15 000.

According to a second alternative of the second variant of the preferred embodiment, any bearing element is two-dimensional of the film type with an aspect ratio K at least equal to 50.

In the case of the second alternative of the second variant of the preferred embodiment, the surface density D of the identical two-dimensional bearing elements of the film type per unit area of the radially outer structure of revolution, expressed in $1/m^2$, is advantageously at least equal to 100 and at most equal to 1000.

Advantageously, the largest characteristic dimension L of the mean section S of a two-dimensional bearing element of the film type is at most equal to 0.9 times the smallest of the axial widths of the radially outer and radially inner structures of revolution, respectively, the respective axial widths of the radially outer and radially inner structures of revolution, respectively, not necessarily being the same. Beyond this value, the bearing element is what is known as a continuous film, i.e. one circumferentially separating the inner cavity of the tire into cells.

When a two-dimensional bearing element is planar, its mean plane is not necessarily radial, that is to say perpendicular to the axis of rotation of the tire. Such a bearing element is not akin to a spoke. This non-radial direction of the mean plane makes it possible, in particular, to alter the stiffnesses of the tire device in the axial and circumferential directions, respectively.

As far as the nature of the material is concerned, any bearing element advantageously comprises a material of the polymer or metal or glass or carbon type. Polymers, in particular elastomers, and metal, such as steel, are commonly used in the field of tires. Glass and carbon are alternative materials that are conceivable for use in tires.

In a first variant of the material, any bearing element advantageously comprises polyethylene terephthalate (PET). PET is commonly used in the field of tires on account of a good compromise between its mechanical properties, such as its resistance to breaking under tension, and its cost.

In a second variant of the material, any bearing element also advantageously comprises an aliphatic polyamide, such as nylon. Nylon is also commonly used in the field of tires for the same reasons as PET.

According to a first variant of the structure, any bearing element has a homogeneous structure, comprising a single constituent. It is the simplest conceivable structure, such as a thread or a membrane, for example.

According to a second variant of the structure, any bearing element has a composite structure, comprising at least two constituents. It is a structure made up of an assembly of at least two elements, such as, by way of example, a cord made up of an assembly of elementary threads.

In a first variant of the composition, any bearing element comprises a single material: by way of example, a thread or a cord made of textile material.

In a second variant of the composition, any bearing element comprises at least two materials. In this case, there is a composite structure from the point of view of the materials: for example, a hybrid cord comprising threads having different materials, such as aramid and nylon, or a fabric comprising textile reinforcers coated with an elastomeric material and disposed parallel to one another or in the form of a weave.

The circumferential reinforcement of the radially outer structure of revolution advantageously comprises, radially from the outside to the inside, at least one radially outer reinforcing layer that is in contact with the tread and comprises textile or metal reinforcing elements, at least one intermediate elastomeric layer and at least one radially inner reinforcing layer that comprises textile or metal reinforcing elements. This circumferential reinforcement, formed by the radial superposition of the above-described layers, is also known as a "shear band". Under the action of the load applied, the relative deformations of the reinforcing elements of the radially outer and inner reinforcing layers, respectively, cause shearing of the intermediate elastomeric layer. It makes it possible to obtain radial, axial and circumferential stiffnesses, respectively, of the tire-type device, these stiffnesses being sufficiently high to ensure the expected performance.

The radially inner structure of revolution also advantageously comprises, on a radially inner face, a connecting layer intended to be fixed to the means for mounting on the vehicle. The connecting layer generally comprises at least one elastomeric material, but not necessarily a reinforcement. Fixing to the mounting means can be realized by the pressure forces that result from the inflation of the tire-type device.

According to one variant embodiment, the radially inner structure of revolution comprises, on a radially inner face, a connecting layer intended to be fixed to the means for mounting on the vehicle, by bonding. A bonded connection makes it possible in particular to avoid any rotation of the tire-type device with respect to the means for mounting on the vehicle.

A further aspect of the invention is directed to a mounted assembly comprising a tire device according to one of the above-described embodiments, mounted on a means for mounting on the vehicle.

The tire-type device of the invention can be manufactured, for example, by the method described below. The bearing structure is manufactured separately in the form of a composite structure of the sandwich type, made up of a first elastomeric layer, intended to be secured to the radially inner structure of revolution, a second elastomeric layer, intended to be secured to the radially outer structure of revolution, and bearing elements that extend from the first elastomeric layer to the second elastomeric layer. Any known method for manufacturing a composite structure of the sandwich type can be used. Once the bearing structure has been produced, the tire-type device can be manufactured in accordance with the following method steps:

wrapping the radially inner structure of revolution over a drum, the diameter of which is equal to that of the mounting means, onto which the tire-type device is intended to be mounted, wrapping the bearing structure over the radially inner structure of revolution, wrapping the radially outer structure of revolution over the bearing structure, curing the device.

The mounted assembly according to the invention can be produced by fixing the tire-type device to a mounting means, such as a rim. This fixing can be carried out, for example, by bonding the radially inner face of the radially inner structure of revolution to the radially outer face of the mounting means.

BRIEF DESCRIPTION OF THE DRAWINGS

The present invention will be better understood with the aid of FIGS. 1 to 6 presented below.

DETAILED DESCRIPTION OF THE DRAWINGS

Figure 1:
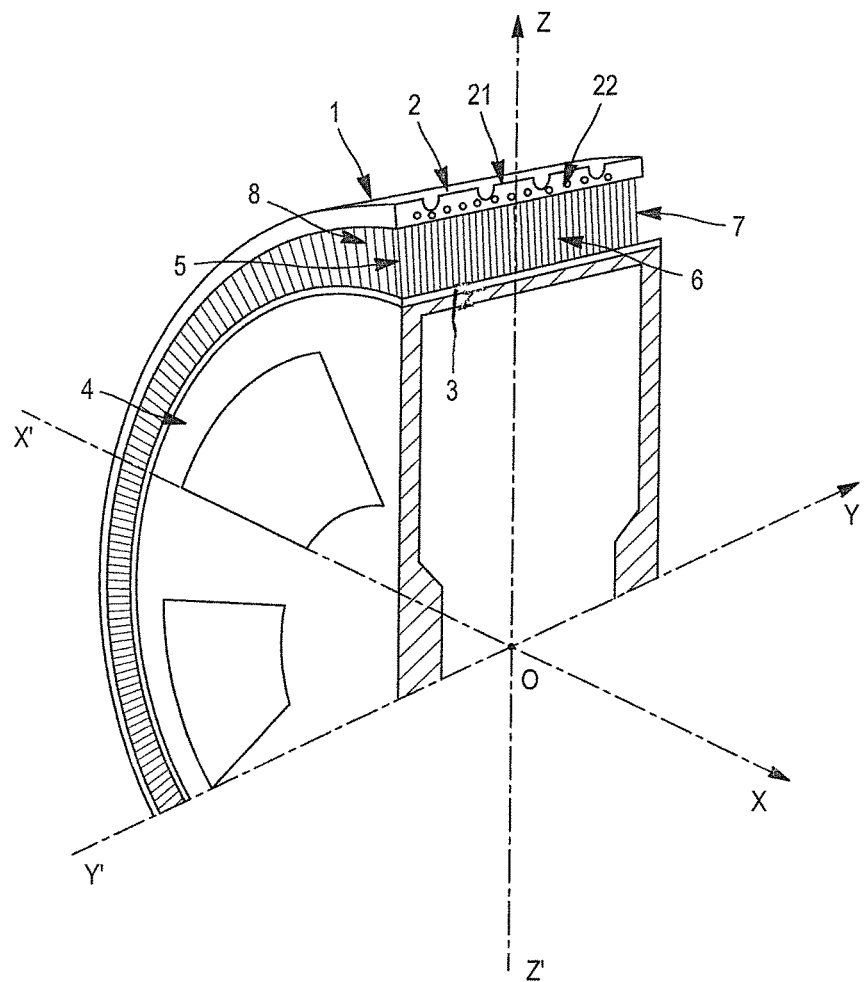
FIG. 1: perspective view in partial section of a tire-type device according to the invention

FIG. 1 shows a perspective view in partial section of a tire-type device 1 according to the invention, mounted on a mounting means 4 or rim, and comprising a radially outer structure of revolution 2, a radially inner structure of revolution 3, an inner annular space 5 and a bearing structure 6.

The radially outer structure of revolution 2 has an axis of revolution which is the axis of rotation YY' of the tire-type device and is intended to come into contact with the ground via a tread 21 comprising at least one elastomeric material. Moreover, the radially outer structure of revolution 2 comprises a circumferential reinforcement 22. The radially inner structure of revolution 3, which is coaxial with the radially outer structure of revolution 2, is intended to ensure the connection of the tire-type device 1 with the mounting means 4. The radially inner structure of revolution 3 comprises at least one polymeric material, most frequently an elastomer compound. The inner annular space 5 is radially delimited by the radially outer 2 and radially inner 3 structures of revolution, respectively. According to the invention, the bearing structure 6 is made up of a plurality of bearing elements 7 that extend continuously from the radially outer structure of revolution 2 to the radially inner structure of revolution 3 and are independent in pairs in the inner annular space 5.

Figure 2:
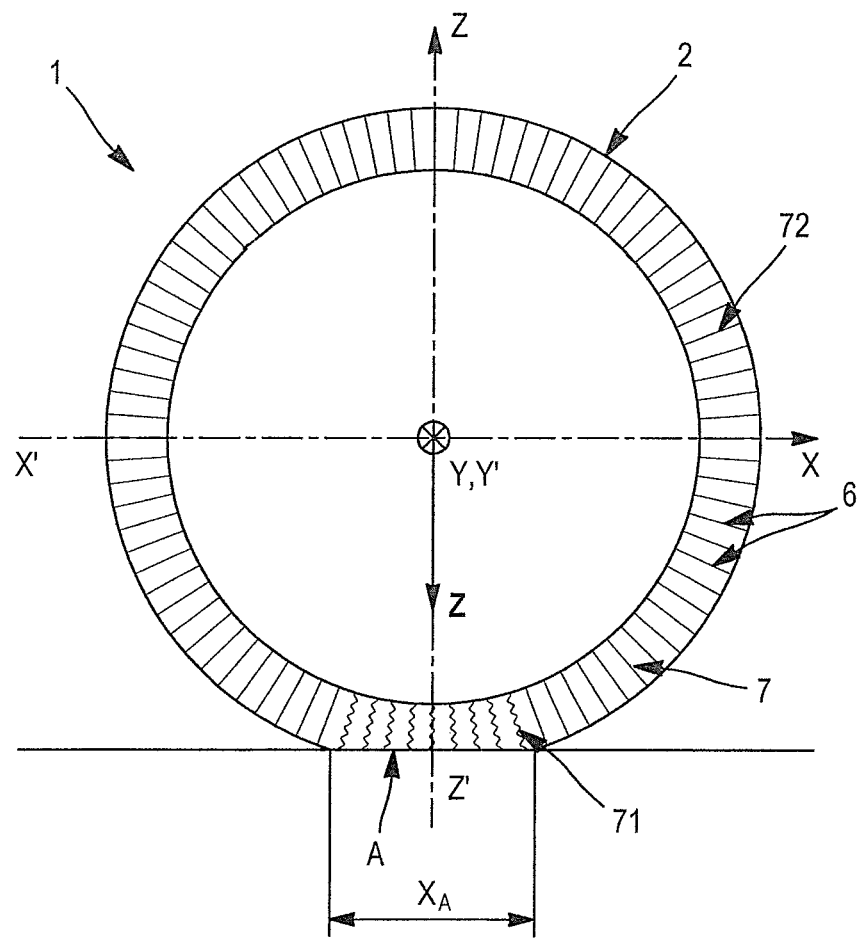
FIG. 2: view in circumferential section of a tire-type device according to an embodiment of the invention, in the squashed state

FIG. 2 shows a circumferential section of a tire-type device 1 according to the invention, mounted on a mounting means 4 (see FIG. 1—not shown in FIG. 2 so as not the clutter the view in FIG. 2), in its squashed state, that is to say subjected to a nominal radial load Z. The bearing structure 6 is made up of a plurality of bearing elements 7 that extend continuously from the radially outer structure of revolution 2 to the radially inner structure of revolution 3 (see FIG. 1—not shown in FIG. 2 so as not the clutter the view in FIG. 2) and are independent in pairs in the inner annular space 5. The tire-type device 1, subjected to a nominal radial load Z, is in contact with flat ground by way of an area of contact A, having a circumferential length $X_A$. The bearing elements 71 which are connected to that portion of the radially outer structure of revolution 2 that is in contact with the ground are made to buckle under compression, while at least some of the bearing elements 72 that are connected to that portion of the radially outer structure of revolution 2 that is not in contact with the ground are under tension. FIG. 2 shows a particular embodiment of the invention with bearing elements 7 that are identical and oriented radially. In accordance with the invention, the surface density D of the bearing elements 7 per unit area of the radially outer structure of revolution 2, expressed in $1/m^2$, is at least equal to $Z/(A*Fr)$, where Z is the nominal radial load, expressed in N, A is the area of contact with the ground, expressed in $m^2$, and Fr is the force at break under tension of any bearing element, expressed in N.

Figure 3A:
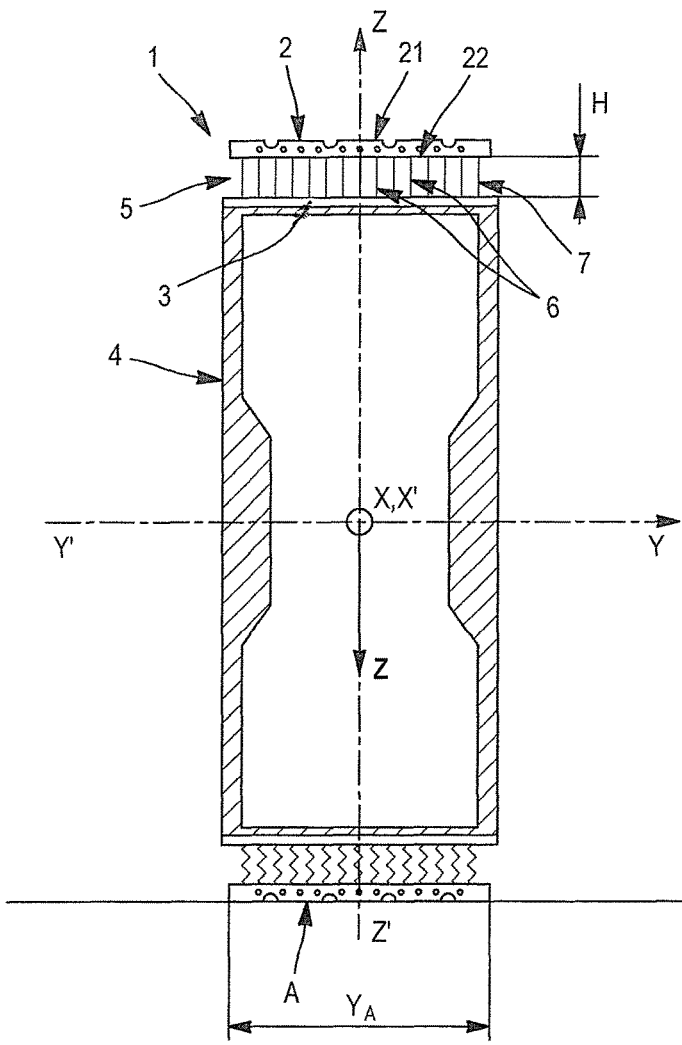
FIG. 3A: view in meridian section of a tire-type device according to an embodiment of the invention, in the case of a bearing structure having one-dimensional bearing elements

FIG. 3A shows a meridian section of a tire-type device 1 according to the invention, mounted on a mounting means 4, in the case of a bearing structure 6 having one-dimensional bearing elements 7. As described for FIG. 1, the tire-type device 1 comprises a radially outer structure of revolution 2, a radially inner structure of revolution 3, an inner annular space 5 and a bearing structure 6. The tire-type device 1, subjected to a nominal radial load Z, is in contact with flat ground by way of an area of contact A, having an axial width $Y_A$. In the case shown, all of the bearing elements 7 are identical and oriented radially, and thus have a length equal to the mean radial height H of the inner annular space 5. As seen above, the bearing elements 7 that are positioned on the opposite side from the contact patch are under tension, while the bearing elements 7 that are connected to that portion of the radially outer structure of revolution 2 in contact with the ground are made to buckle under compression.

Figure 3B:
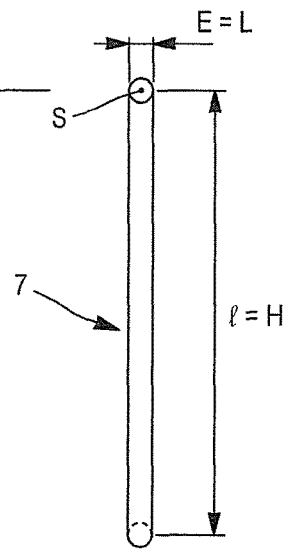
FIG. 3B: perspective view of a one-dimensional bearing element
Figures 4A, 4B:
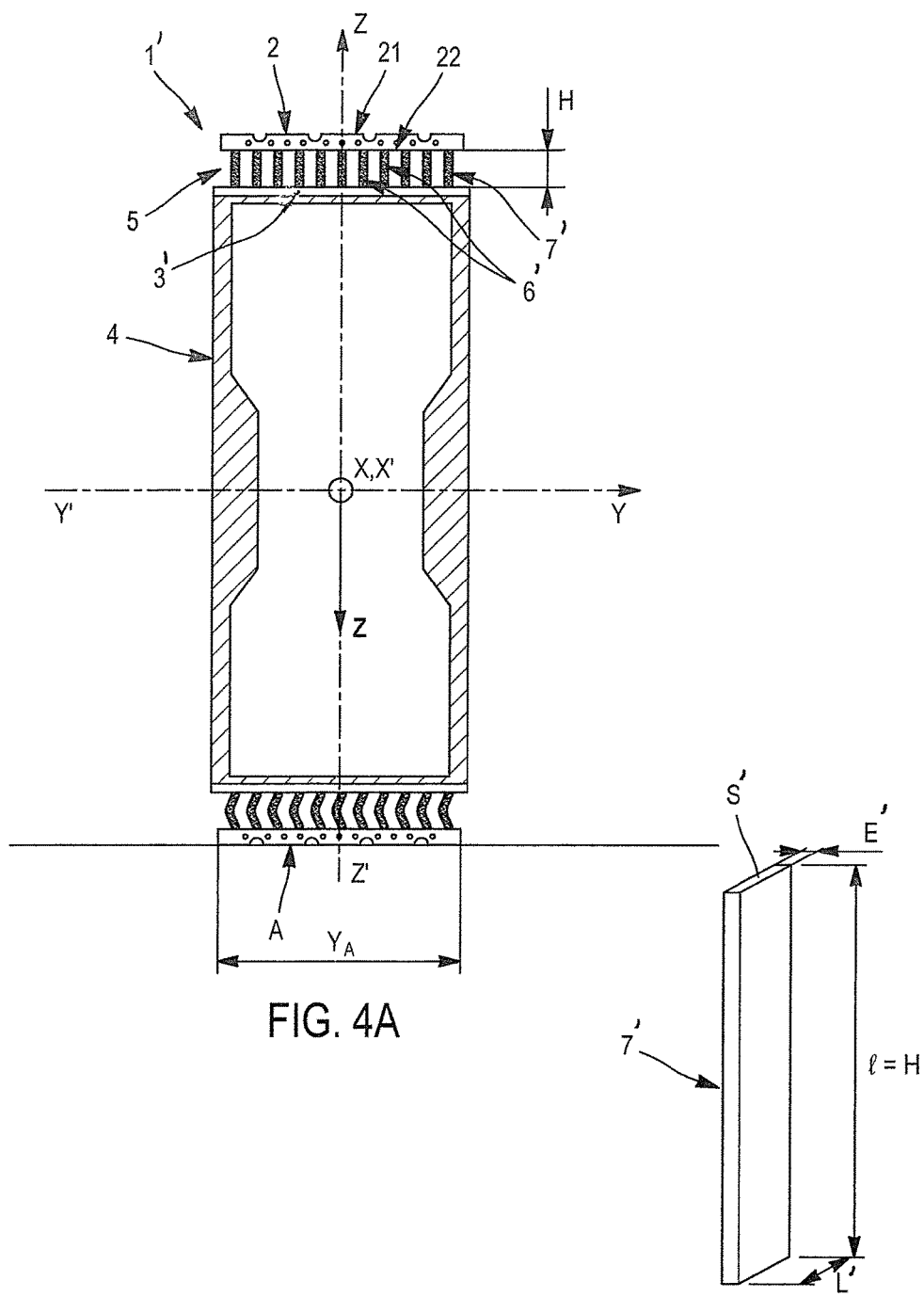
FIG. 4A: view in meridian section of a tire-type device according to an embodiment of the invention, in the case of a bearing structure having two-dimensional bearing elements of the strip type
FIG. 4B: perspective view of a two-dimensional bearing element of the strip type

FIG. 3B shows a one-dimensional bearing element 7 having a circular mean section S that is defined by a smallest characteristic dimension E and a largest characteristic dimension L that are both equal to the diameter of the circle, and is characterized by its aspect ratio K equal to L/E. The smallest characteristic dimension E of the mean section S of the bearing element 7, that is to say, in the present case, its diameter, is at most equal to 0.02 times the mean radial height H of the inner annular space 5. Furthermore, in this particular case of a circular section, the aspect ratio K is equal to 1. Since the bearing element 7 is oriented radially, its length l is equal to the mean height H of the inner annular space 5. FIG. 4A shows a meridian section of a tire-type device 1' according to the invention, mounted on a mounting means 4, in the case of a bearing structure 6' having two-dimensional bearing elements 7' of the strip type. As described for FIG. 1, the tire-type device 1' comprises a radially outer structure of revolution 2, a radially inner structure of revolution 3', an inner annular space 5 and a bearing structure 6'. The tire-type device 1', subjected to a nominal radial load Z, is in contact with flat ground by way of an area of contact A, having an axial width $Y_A$. In the case shown, all of the bearing elements 7' are identical and oriented radially, and thus have a length equal to the mean radial height H of the inner annular space 5. As seen above, the bearing elements 7' that are positioned on the opposite side from the contact patch are under tension, while the bearing elements 7' that are connected to that portion of the radially outer structure of revolution 2 in contact with the ground are made to buckle under compression.

FIG. 4B shows a two-dimensional bearing element 7' of the strip type, having a rectangular mean section S' that is defined by its smallest characteristic dimension E', or thickness, and its largest characteristic dimension L' or width, and is characterized by its aspect ratio K equal to L'/E'. The smallest characteristic dimension E' of the mean section S' of the bearing element 7', that is to say, in the present case, its thickness, is at most equal to 0.02 times the mean radial height H of the inner annular space 5. In the case of a two-dimensional bearing element 7' of the strip type, the aspect ratio K is at least equal to 3 and at most equal to 50. Since the bearing element 7' is oriented radially, its length l is equal to the mean height H of the inner annular space 5.

Figure 5A:
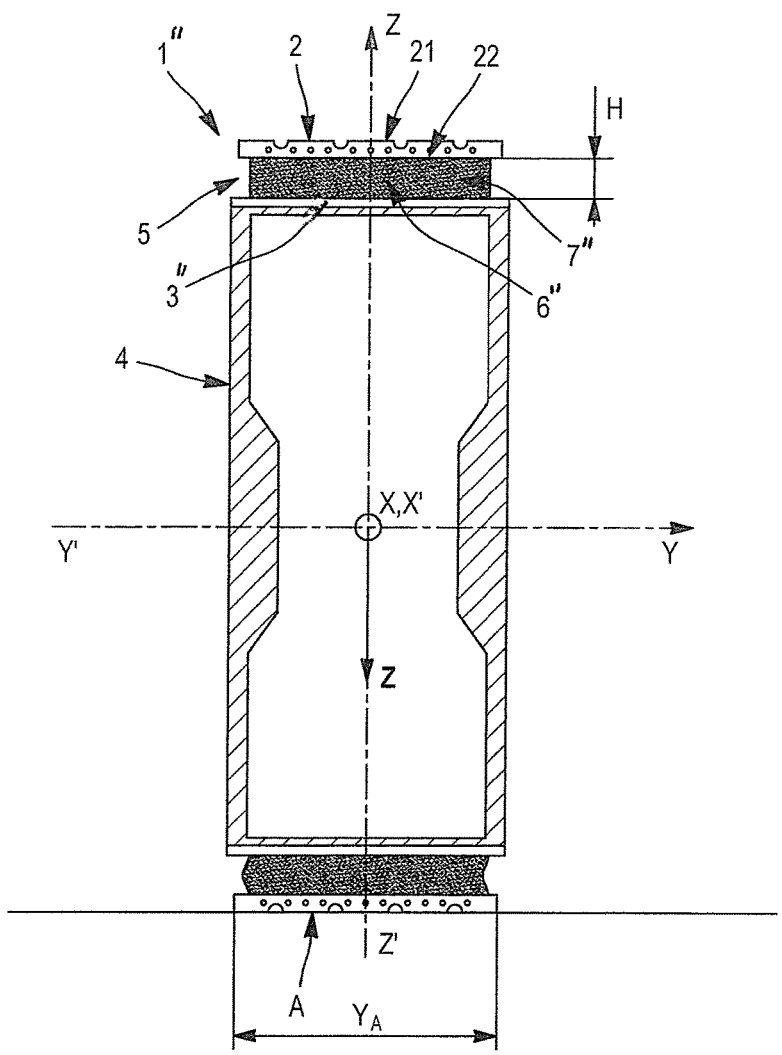
FIG. 5A: view in meridian section of a tire-type device according to an embodiment of the invention, in the case of a bearing structure having two-dimensional bearing elements of the film type

FIG. 5A shows a meridian section of a tire-type device 1" according to the invention, mounted on a mounting means 4, in the case of a bearing structure 6" having two-dimensional bearing elements 7" of the film type. As described for FIG. 1, the tire-type device 1" comprises a radially outer structure of revolution 2, a radially inner structure of revolution 3", an inner annular space 5 and a bearing structure 6". The tire-type device 1", subjected to a nominal radial load Z, is in contact with flat ground by way of an area of contact A, having an axial width $Y_A$. In the case shown, all of the bearing elements 7" are identical and oriented radially, and thus have a length equal to the mean radial height H of the inner annular space 5. As seen above, the bearing elements 7" that are positioned on the opposite side from the contact patch are under tension, while the bearing elements 7" that are connected to that portion of the radially outer structure of revolution 2 in contact with the ground are made to buckle under compression.

Figure 5B:
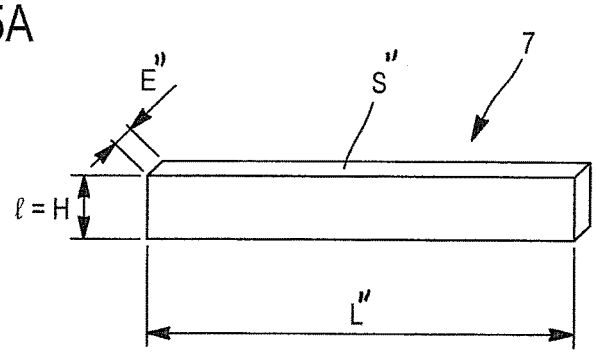
FIG. 5B: perspective view of a two-dimensional bearing element of the film type

FIG. 5B shows a two-dimensional bearing element 7" of the film type, having a rectangular mean section S" that is defined by its smallest characteristic dimension E", or thickness, and its largest characteristic dimension L" or width, and is characterized by its aspect ratio K equal to L"/E". The smallest characteristic dimension E" of the mean section S" of the bearing element 7", that is to say, in the present case, its thickness, is at most equal to 0.02 times the mean radial height H of the inner annular space 5. In the case of a two-dimensional bearing element 7" of the film type, the aspect ratio K is at least equal to 50. Since the bearing element 7" is oriented radially, its length l is equal to the mean height H of the inner annular space 5.

Figure 6:
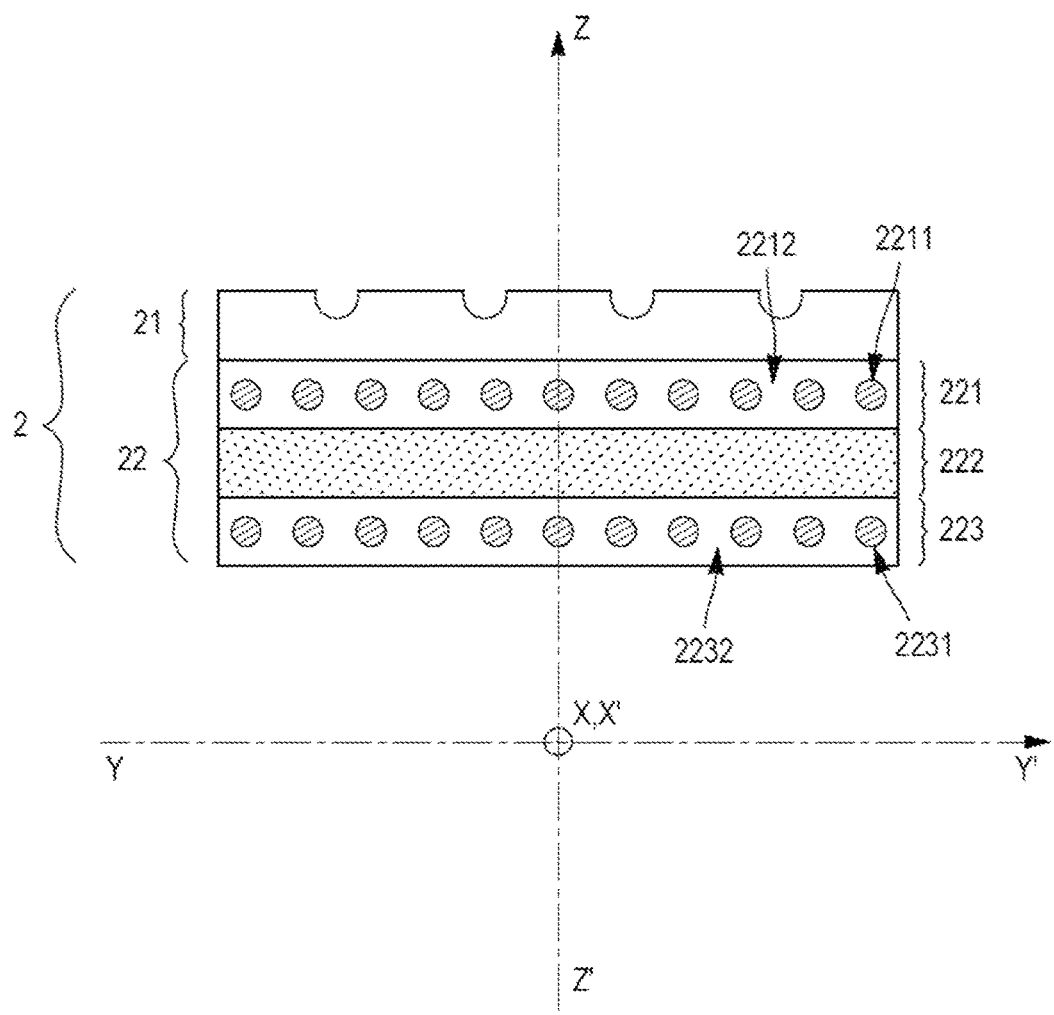
FIG. 6: meridian section, in a meridian plane YZ, of a preferred embodiment of a radially outer structure of revolution with a shear band.

FIG. 6 presents a meridian section, in a meridian plane YZ, of a preferred embodiment of a radially outer structure of revolution (2), comprising, radially from the outside to the inside, a tread (21) and a circumferential reinforcement (22). The circumferential reinforcement (22) of the radially outer structure of revolution (2) comprises, radially from the outside to the inside, a radially outer reinforcing layer (221) that is in contact with the tread (21) and comprises reinforcing elements (2211) coated in an elastomeric compound (2212), an intermediate elastomeric layer (222) and a radially inner reinforcing layer (223) that comprises reinforcing elements (2231) coated in an elastomeric compound (2232).

The invention has been studied more particularly as an alternative solution to a conventional tire for a passenger vehicle.

Although the bearing structure according to the invention is preferably made up of identical bearing elements in terms of aspect ratio K, in terms of structure and in terms of material, it may be made up of any combination of bearing elements, such as, for example:

one-dimensional bearing elements having different aspect ratios K and/or structures and/or materials, two-dimensional bearing elements having different aspect ratios K and/or structures and/or materials, one-dimensional bearing elements and two-dimensional bearing elements, this list not being exhaustive.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire-type device intended to equip a vehicle, comprising:
    a radially outer structure of revolution, the axis of revolution of which is the axis of rotation of the tire-type device and which is adapted to come into contact with the ground via a tread comprising at least one elastomeric material, the radially outer structure of revolution having two axial ends and comprising a circumferential reinforcement;
    a radially inner structure of revolution that is coaxial with the radially outer structure of revolution and is adapted to ensure the connection of the tire-type device with a means for mounting on the vehicle, the radially inner structure of revolution having two axial ends and comprising at least one polymeric material;
    an inner annular space of mean radial height H that is radially delimited by the radially outer and radially inner structures of revolution, respectively;
    a bearing structure comprised of a plurality of bearing elements that extend continuously from the radially outer structure of revolution to the radially inner structure of revolution and are independent in pairs in the inner annular space, such that, when the tire-type device is subjected to a nominal radial load Z and is in contact with flat ground via an area of contact A, n bearing elements that are connected to that portion of the radially outer structure of revolution in contact with the ground are made to buckle under compression and at least some of the bearing elements that are connected to that portion of the radially outer structure of revolution that is not in contact with the ground are under tension;
    each said bearing element having a force at break under tension Fr, and a mean section S that has an aspect ratio K equal to L/E, where L and E are the largest and smallest characteristic dimensions, respectively, of the mean section S,
    wherein the smallest characteristic dimension E of the mean section S of any said bearing element is at most equal to 0.02 times the mean radial height H of the inner annular space, and wherein the surface density D of the bearing elements per unit area of the radially outer structure of revolution, expressed in $1/m^2$, is at least equal to $Z/(A*\Sigma Fr/n)$, where Z is the nominal radial load, expressed in N, A is the area of contact with the ground, expressed in $m^2$, and $\Sigma Fr/n$ is the mean force at break under tension of the n bearing elements made to buckle under compression, expressed in N.

2. The tire-type device according to claim 1, wherein the surface density D of the bearing elements per unit area of the radially outer structure of revolution, expressed in $1/m^2$, is at least equal to $3*Z/(A*\Sigma Fr/n)$.

3. The tire-type device according to claim 1, wherein the surface density D of the bearing elements per unit area of the radially outer structure of revolution, expressed in $1/m^2$, is at least equal to $6*Z/(A*\Sigma Fr/n)$.

4. The tire-type device according to claim 1, wherein all of the bearing elements have an identical force at break under tension Fr.

5. The tire-type device according to claim 1, wherein all of the bearing elements are identical.

6. The tire-type device according to claim 1, wherein any said bearing element is one-dimensional with an aspect ratio K at most equal to 3.

7. The tire-type device according to claim 1, wherein any said bearing element is two-dimensional with an aspect ratio K at least equal to 3.

8. The tire-type device according to claim 7, wherein any said bearing element is two-dimensional of a strip type with an aspect ratio K at least equal to 3 and at most equal to 50.

9. The tire-type device according to claim 7, wherein any said bearing element is two-dimensional of a film type with an aspect ratio K at least equal to 50.

10. The tire-type device according to claim 1, wherein any said bearing element comprises a material of the polymer or metal or glass or carbon type.

11. The tire-type device according to claim 1, wherein any said bearing element comprises polyethylene terephthalate (PET).

12. The tire-type device according to claim 1, wherein any said bearing element comprises an aliphatic polyamide.

13. The tire-type device according to claim 1, wherein the circumferential reinforcement of the radially outer structure of revolution comprises, radially from the outside to the inside, at least one radially outer reinforcing layer that is in contact with the tread and comprises textile or metal reinforcing elements, at least one intermediate elastomeric layer and at least one radially inner reinforcing layer that comprises textile or metal reinforcing elements.

14. The tire-type device according to claim 1, wherein the radially inner structure of revolution comprises, on a radially inner face, a connecting layer intended to be fixed to the means for mounting on the vehicle.

15. A mounted assembly comprising the tire-type device according to claim 1 mounted on a means for mounting on the vehicle.

\* \* \* \* \*